United States Patent
Dickens

(10) Patent No.: US 11,261,347 B2
(45) Date of Patent: Mar. 1, 2022

(54) WATER IN OIL EMULSION AUTOMOTIVE WAX PRODUCT

(71) Applicant: Carroll Benford Dickens, Santa Ana, CA (US)

(72) Inventor: Carroll Benford Dickens, Santa Ana, CA (US)

(*) Notice: Subject to any disclaimer, the term of this patent is extended or adjusted under 35 U.S.C. 154(b) by 268 days.

(21) Appl. No.: 16/156,809

(22) Filed: Oct. 10, 2018

(65) Prior Publication Data

US 2019/0106597 A1   Apr. 11, 2019

Related U.S. Application Data

(60) Provisional application No. 62/570,843, filed on Oct. 11, 2017.

(51) Int. Cl.
| | |
|---|---|
| *C09G 1/12* | (2006.01) |
| *C08L 83/12* | (2006.01) |
| *C08L 83/04* | (2006.01) |
| *C08L 83/00* | (2006.01) |
| *C08L 91/00* | (2006.01) |
| C08G 77/04 | (2006.01) |
| C08G 77/46 | (2006.01) |

(52) U.S. Cl.
CPC ............. *C09G 1/12* (2013.01); *C08L 83/00* (2013.01); *C08L 83/04* (2013.01); *C08L 83/12* (2013.01); *C08L 91/00* (2013.01); C08G 77/045 (2013.01); C08G 77/46 (2013.01)

(58) Field of Classification Search
CPC . C09G 1/12; C08L 83/12; C08L 83/04; C08L 83/00; C08L 91/00; C08G 77/045; C08G 77/46
See application file for complete search history.

(56) References Cited

U.S. PATENT DOCUMENTS

| | | |
|---|---|---|
| 2,626,870 A | 1/1953 | Cooke et al. |
| 3,393,078 A | 7/1968 | Lockhart et al. |
| 4,218,250 A | 8/1980 | Kasprzak |
| 4,398,953 A | 8/1983 | van der Linde |
| 5,017,222 A | 5/1991 | Cifuentes |
| 5,215,582 A | 6/1993 | Bolt et al. |
| 5,261,951 A * | 11/1993 | Sejpka ............... C08J 3/03 106/10 |
| 5,700,312 A | 12/1997 | Fausnight |
| 5,753,607 A | 5/1998 | Burke et al. |
| 5,968,238 A | 10/1999 | Healy et al. |
| 6,013,323 A | 1/2000 | Klayder et al. |
| 6,602,835 B2 | 8/2003 | Schmeida et al. |
| 6,953,500 B2 | 10/2005 | Lewis |
| 6,992,125 B2 | 1/2006 | Keller et al. |
| 7,041,374 B1 | 5/2006 | Nelson et al. |
| 7,503,963 B2 | 3/2009 | Jordan et al. |
| 9,822,288 B2 | 11/2017 | Dickens |
| 10,308,847 B1 | 6/2019 | Dickens |
| 2005/0131081 A1 | 6/2005 | Ueno et al. |
| 2007/0178239 A1 | 8/2007 | Kestell et al. |
| 2007/0277697 A1 | 12/2007 | Diamond et al. |
| 2009/0233017 A1 | 12/2009 | Tsuno et al. |
| 2013/0059955 A1 | 3/2013 | Tai |
| 2013/0202970 A1 | 8/2013 | Lu et al. |
| 2014/0350175 A1 | 11/2014 | Dinkar et al. |
| 2014/0357790 A1 | 12/2014 | Dickens |

FOREIGN PATENT DOCUMENTS

| | | |
|---|---|---|
| CN | 102660199 A | 9/2012 |
| DE | 19929011 A1 | 12/2000 |
| EP | 1847573 A1 | 10/2007 |
| EP | 3604391 A1 | 2/2020 |
| WO | 1994005731 A1 | 3/1994 |

OTHER PUBLICATIONS

Clearco PSF-6,0000cSt Pure Silicone Fluid Safety Data Sheet, 2019, p. 1-8.*

* cited by examiner

*Primary Examiner* — Robert S Jones, Jr.
(74) *Attorney, Agent, or Firm* — Nguyen Tarbet LLC

(57) ABSTRACT

An automotive wax emulsion created by a unique cold, reverse, water-in-oil (W/O) emulsion process is described herein. The emulsion is created at room temperatures under high shear in minutes. The formulation can carry various abrasive materials, shine enhancement actives, wax and lubrication components without preservatives. The formulation provides for an emulsion with unique "Quick-Break" type characteristics. When applied by hand, the emulsion breaks upon friction with the contact surface releasing the oil-soluble actives in a controlled manner that eliminates the need for electric or pneumatic machine buffing.

20 Claims, 1 Drawing Sheet

Oil-in-Water Emulsion        Water-in-Oil Emulsion

WATER IN OIL EMULSION AUTOMOTIVE WAX PRODUCT

CROSS REFERENCE

This application claims priority to U.S. Provisional Patent Application No. 62/570,843 filed Oct. 11, 2017, the specifications of which are incorporated herein in their entirety by reference.

FIELD OF THE INVENTION

The present invention relates to an automotive wax emulsion created by a low temperature, water-in-oil emulsion process.

BACKGROUND OF THE INVENTION

Emulsions are well-known systems in pharmaceutical, biotechnology, industrial and food industries for providing unique properties that can delivery active ingredients a liquid medium. Emulsions, being liquids, do not exhibit a static internal structure. The droplets dispersed in the liquid matrix (called the "dispersion medium") are usually assumed to be statistically distributed. Emulsion products can be either oil-in-water (O/W) or water-in-oil (W/O). Even though both types are combination of two solutions that are generally immiscible with each other; each is distinct in its chemical properties, applications and more.

The most significant difference between O/W and W/O emulsions is found in the suspending phase of the mixture. Obviously, oil and water are immiscible, but with the proper combination of stabilizing agents, a permanently stable mixture can be achieved. O/W emulsions are composed of oil droplets suspended in an aqueous phase, while W/O is opposite having water droplets suspended in a continuous oil phase. To create an effective emulsion droplet size for both is important. The smaller the droplet the more stable the emulsion.

The chemical nature of an O/W emulsion is very different from that of a W/O. Each is used to create products with differing applications. O/W emulsions are generally created when the active ingredient is more water-soluble like in hand creams, body lotions and various moisturizers. In contrast, W/O emulsions are used for mostly oil-based products with oil-soluble active components like cosmetic make-up and waterproof sun-screens.

The differences in processing are also very divergent. O/W emulsions traditionally start with a suspension of cellulosic thickener in which stearic acid is mixed. Upon dispersion at high speeds for shear, the batch is heated to about 150° F. where a solution of sodium hydroxide is added slowly initiating saponification of the saturated fatty acid. This mixture is slowly cooled to about 95° F. where the additional actives are added. In contrast, W/O emulsions typically start with the oil phase and all oil-soluble actives charged to the mixing vessel at room temperature. Silicone emulsifiers are added to the oil phase and dispersed. W/O emulsions typically do not require viscosity modifiers. Water is slowly introduced to the mixture under high speed shear. No heat is required for the W/O emulsion to be created and remain stable.

Examples of prior art automotive wax formulations can be found in the following U.S. patents.

U.S. Pat. No. 6,992,125 by Keller et Al. demonstrates the use of a high molecular weight isobutene homo-polymer as a substitution for wax components and incorporates non-reactive, non-functionalized silicone oils into the formulations. The patent lacks a detailed description of the ingredients necessary for a stable water/oil emulsion and the suggested formulations provided do not have enough emulsifier to remain stable for any given length of time. Separation of the emulsions will inevitably occur. In contrast, the formulations of the present invention specifically use modified (PEG Dimethicone Copolyol) silicones that lend stability and performance to create the "quick-break" emulsion properties. The formulations of the present invention are indefinitely stable and require no extra thickeners or preservatives.

Although U.S. Pat. No. 4,218,250 by Kasprzak teaches the improvement of polish formulations by the incorporation of water, a cyclodimethylsiloxane fluid, and a polydiorganosiloxane-polyoxyalkylene copolymer, details of addition, viscosity, final appearance and performance are left out of the patent application. Thus, one of ordinary skill cannot readily produce an automotive wax formulation that would have "quick-break" properties and stability without undue experimentation. Details and particulars for the type of wax and functionalized silanes are also omitted. The present invention lists specifics to the formulation, which also involve the addition of hydrophobically treated silica and calcium carbonates to improve performance and stability that are not found in the claims of Kasprzak. The suggested formulations of the water/oil emulsion differ in order of addition and composition with respect to the surfactant/emulsifier content, hydrophobically modified constituents and abrasive additives.

U.S. Pat. No. 5,700,312 by Fausnight and Lupyan describes a dressing product with silicone fluid emulsions added to the aqueous phase. The formulation also incorporates isoparaffinic hydrocarbon solvents with high boiling points versus the cyclopentasiloxane used in the present invention and is not a polish or wax. U.S. Pat. No. 5,017,222 by Cifuentes and Greenleaf discusses a preparation for the manufacture of a functionalized silane and describes its use in numerous polish/wax formulations. The suggested formulations of the water/oil emulsion differ from those of the present invention, both in order of addition and in composition with respect to the surfactant/emulsifier content, hydrophobically modified constituents and abrasive additives.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention describes a unique formulation for an automotive wax emulsion created by a unique cold, reverse, water-in-oil (W/O) emulsion process. The emulsion is created at room temperatures under high shear in minutes. The formulation can carry various abrasive materials, shine enhancement actives, wax and lubrication components without preservatives. The formulation provides for an emulsion with unique "Quick-Break" type characteristics. When applied by hand, the emulsion breaks upon friction with the contact surface releasing the oil-soluble actives in a controlled manner that eliminates the need for electric or pneumatic machine buffing.

This formulation has an exceptionally smooth and light appearance. Upon application, the emulsion spreads evenly on all surfaces including paint, glass, plastic and chrome. the emulsion breaks instantly with the application of friction releasing the active shine enhancement aids. Application can be accomplished by hand or with a rotating hand-held orbital buffer. Application by hand develops shine, while low-speed orbital machines can be used for micro-surfacing of the paint to eliminate imperfections caused from road use or UV deterioration. After application, the emulsion actives are given a few minutes to haze by allowing evaporation of the water and slow evolving VOC-exempt siloxane carrier solvent. After haze development, the residual powder is removed with a light micro fiber towel. No smears of actives are noticeable from the application due to the exceptionally complete emulsion-break that takes place upon the addition of earlier frictional forces. This reverse-emulsion formulation can be used as a platform for a wide degree of variability of abrasives and shine enhancement ingredients. The formulation is VOC-exempt and preservative-free.

One of the unique and inventive technical features of the present invention is that the water phase is approximately 5 times greater in the formulation than the oil phase even though the emulsion is a water-in-oil type emulsion. Without wishing to limit the invention to any theory or mechanism, it is believed that the technical feature of the present invention advantageously provides for the advantages of water-in-oil type emulsions (such as fast and low temperature formulation), without requiring the use of a VOC carrier. None of the presently known prior references or work has the unique inventive technical feature of the present invention.

Another of the unique and inventive technical features of the present invention is that the emulsion has long-term stability. Without wishing to limit the invention to any theory or mechanism, it is believed that the technical feature of the present invention advantageously provides for the advantage of not requiring additional viscosifying agents, emulsion stabilizers or preservatives. None of the presently known prior references or work has the unique inventive technical feature of the present invention.

After formation of the emulsion, a thick, light, uniform, short-flow, lotion-type emulsion product is obtained. Reverse emulsions impede the growth of microorganisms within the formulation eliminating the necessity for bactericide or moldicide. Colors and fragrance additives remain stable although UV light can cause the colors to lighten over time. The colors may be further stabilized with UV absorbers or hindered amines. Processing time of the emulsion is only 30 to 45 minutes in total.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 1:
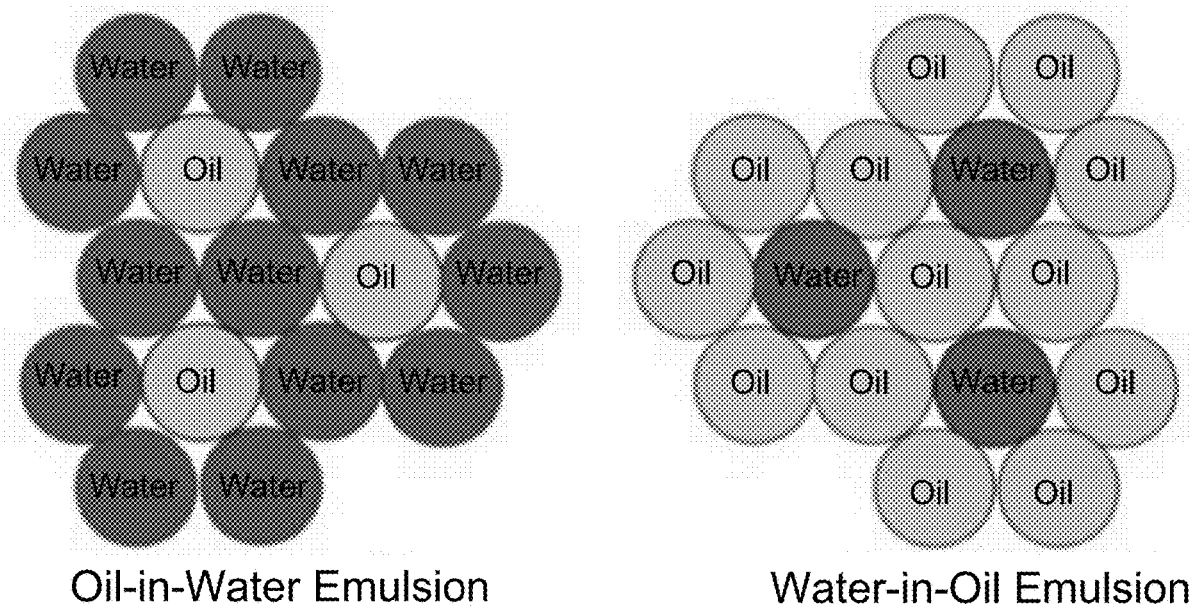
FIG. 1 shows a non-limiting example illustration of oil-in-water and water-in-oil emulsions. The volume ratios of oil and water are not to scale as a water-in-oil emulsion may have a larger volume of water than oil.
Figure 2:
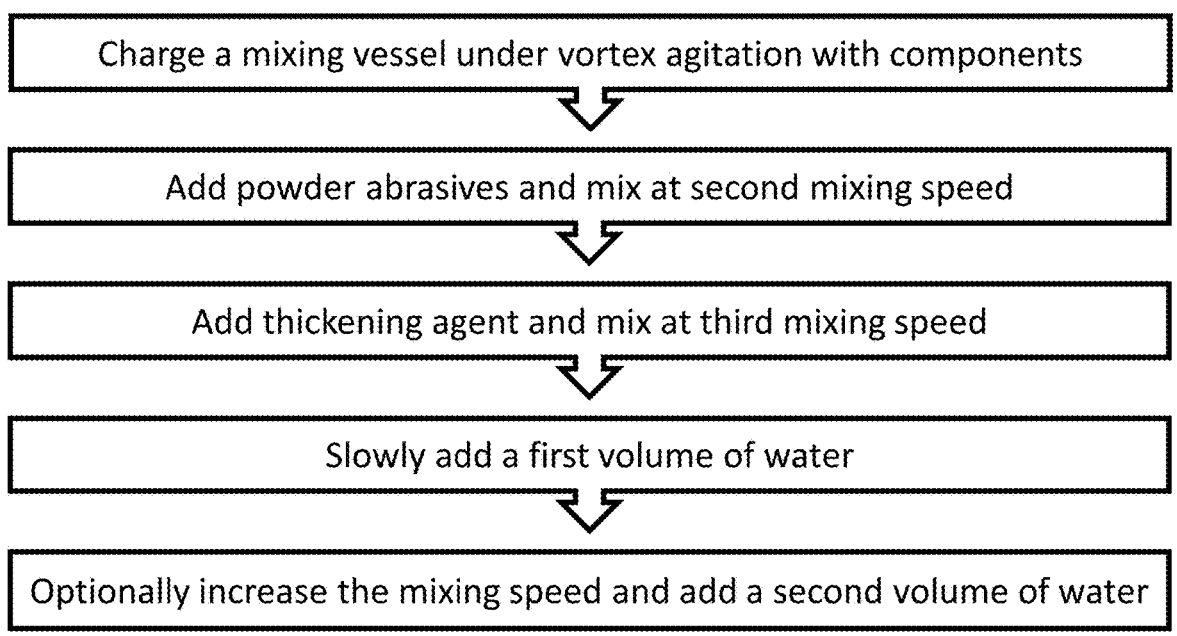
FIG. 2 shows a non-limiting example flowchart for the formation of an automotive wax product, water-in-oil emulsion.

As used herein, the term "vortex agitation" refers to mixing of a fluid or fluid mixture at a high enough speed to generate a vortex. As a non-limiting example, a mixture may be subjected to high speed shear of 300 to 800 revolutions per minute (rpm).

As used herein, the term "polishing agent" refers to an agent which smooths and enhances the shine of a surface when it is rubbed on the surface. A non-limiting example of a polishing agent would be a powder abrasive such as alumina, silica or ceramic powder.

As used herein, the term "waxing agent" refers to a natural substance which is applied to a surface to polish and protect the surface. Non-limiting examples of waxing agents include natural lipids such as beeswax and paraffin.

As used herein, the term "shine enhancing agent" refers to a synthetic substance which is applied to a surface to polish and protect the surface. Non-limiting examples of shine enhancing agents include synthetic wax alternatives such as cationic amino-functional quaternized silicone, aliphatic substituted silanes, alkoxy substituted aliphatic siloxanes or other siloxanes that may form reactive silanol groups.

In one embodiment, the present invention may feature an automotive wax composition comprising a water-in-oil emulsion. As a non-limiting example, the emulsion may comprise an oil phase carrier at about 12-20 wt %, one or more emulsifiers at about 2-7 wt %, a shine enhancing agent at about 0.1-3 wt %, a waxing agent at about 0.1-4 wt %, a lubricating agent at about 0.1-2 wt %, a polishing agent at about 0.1-8 wt %, and water at about 55-80 wt %, wherein the water-in-oil emulsion is free of volatile organic compounds and preservatives.

In other embodiments, the emulsion may comprise an oil phase carrier at about 10-25 wt %, one or more emulsifiers at about 1-10 wt %, a lubricating agent at about 0.1-2 wt %, one or more surface enhancing agents at about 0.1-20 wt %, and water at about 55-80 wt %, wherein the water-in-oil emulsion is free of volatile organic compounds and preservatives. As a non-limiting example, the surface enhancing agent may be selected from a group comprising: a shine enhancing agent, a polishing agent, a waxing agent, or a combination thereof.

In some embodiments, the present invention may feature a method of forming an automotive wax product, water-in-oil emulsion. As a non-limiting example, the method may comprise:

a. charging a mixing vessel under vortex agitation with a plurality of components, the components comprising:
  i. an oil phase carrier at about 12-20 wt %;
  ii. one or more emulsifiers at about 2-7 wt %;
  iii. a shine enhancing agent at about 0.1-3 wt %;
  iv. a waxing agent at about 0.1-4 wt %; and
  v. a lubricating agent at about 0.1-2 wt %;
  wherein the temperature is about 20-25° C., and wherein the vortex agitation is caused by a mixer running at a first mixing speed;
b. adding a polishing agent at about 0.1-8 wt % and running the mixer at a second mixing speed;
c. adding a tracing agent at about 0.1-8 wt % and running the mixer at a third mixing speed;
d. slowly adding a first volume of water; and
e. optionally increasing the speed of the mixer to a fourth mixing speed and adding a second volume of water;
  wherein the combined volumes of water comprise about 55-80 wt % of the emulsion, and wherein the emulsion is free of volatile organic compounds and preservatives.

In preferred embodiments, the first mixing speed may be about 250-300 rpm, the second mixing speed may be about 250-450 rpm, the third mixing speed may be about 400-750 rpm, and the fourth mixing speed may be about 500-750 rpm. In other embodiments, any or all of the mixing speeds may be the same. In still other embodiments, the total processing time may be less than 45 min and the method may require no heating.

In a preferred embodiment, the oil phase carrier may comprise a siloxane, a cyclomethicone or cyclopentasiloxane. In another preferred embodiment, the emulsifiers may comprise one or more dimethicone copolyols. As a non-limiting example, the dimethicone copolyols may comprise one or more of the following: polyethylene glycol/polypropylene glycol-18/18 dimethicone, polyethylene glycol-12 dimethicone, and polyethylene glycol-10 dimethicone. In still another embodiment, the shine enhancing agent may comprise dimethyl siloxane, a cationic amino-functional quaternized silicone, an aliphatic substituted silane, an alkoxy substituted aliphatic siloxane or another siloxane that may form reactive silanol groups. As a non-limiting example, a substituted siloxane may react with water to substitute the substituent for a reactive silanol group.

In some embodiments, the waxing agent may comprise montan wax, micronized montanic acid, or carnauba wax. In other embodiments, the lubricating agent may comprise polytetrafluoroethylene. In still other embodiments, the polishing agent may comprise one or more powder abrasives. As a non-limiting example, the one or more powder abrasives may be selected from the group comprising: aluminium oxide, calcined alumina, kaolin clay, kaolin ceramic powder, micronized glass frit, and amorphous silica. 1. In some embodiments the emulsion may additionally comprise a tracing agent at about 0.1-4 wt %. In one embodiment, the tracing agent may comprise calcium carbonate.

According to one embodiment, the emulsion is a stable emulsion and does not require the addition of additional viscosifying agents or emulsion stabilizers. In another embodiment, the emulsion may also comprise one or more fragrance or color additives. In further embodiments, the composition may be configured for an application by hand or a hand-held buffer, and the emulsion may be configured to break upon friction with a contact surface and release one or more oil-soluble components. As a non-limiting example, the application may eliminate the need for electric or pneumatic machine buffing.

In selected embodiments, the composition may comprise at least one of a sealant, a powder abrasive, a wax or a combination thereof. As non-limiting examples, the amount of shine enhancing agent may be increased to form a sealant, the waxing agent may be excluded and the amount of polishing agent may be increased to form a powder abrasive, or the polishing agent may be excluded and the amount of waxing agent may be increased to from a wax. In some embodiments, a consistency of the composition may be similar to that of instant pudding, mayonnaise or cotton candy.

EXAMPLE 1

The following procedure is included as a non-limiting example of the formation of an automotive wax product, water-in-oil emulsion.

Charge mixing vessel under ambient conditions (20-25° C.) in order 1 to 13 under medium vortex agitation using a high speed dispersing mixer at approximately 300 rpm.
1. Cyclopentasiloxane (15 wt %)
2. PEG/PPG-18/18 Dimethicone (2.5 wt %)
3. PEG-12 Dimethicone (2 wt %)
4. PEG-10 Dimethicone (2 wt %)
5. Dimethyl Siloxane (0-2 wt %)
6. Micronized Montanic Acid (0-3 wt %)
7. Polytetrafluoroethylene (0-1.5 wt %)
8. Calcined Alumina (0-3 wt %)
9. Kaolin Ceramic Powder (0-3 wt %)
10. Amorphous Silica (2 wt %)
11. Calcium Carbonate (3 wt %)
12. Fragrance (q.s.)
13. Color (q.s.)
14. Water (60-75 wt %)

Allow 5 minutes for dispersion.
Increase dispersing speed to 450 rpm and slowly begin adding water. Batch will begin to thicken.
Increase speed again to 650 rpm when 75% of water is added. The final result is obtained when the complete water phase has been added achieving maximum viscosity.
Total processing time is less than 45 minutes and heat is never required.

EXAMPLE 2

TABLE 1 shows non-limiting embodiments of water-in-oil emulsion, automotive products. Equivalents or substitutes are within the scope of the invention.

TABLE 1

| | Formula | | | | | |
|---|---|---|---|---|---|---|
| Component | 0 (Cut) wt % | 1 (Restore) wt % | 2 (Clean) wt % | 3 (Shine) wt % | 4 (Protect) wt % | 5 (Seal) wt % |
| Cyclopentasiloxane | 5-15 | 5-15 | 5-15 | 5-15 | 5-15 | 5-15 |
| Dimethicone copolyols | 1-2 | 1-2 | 1-2 | 0-6.5 | 1-2 | 1-2 |
| Dimethyl Siloxane | — | — | — | 0-2 | 0-2 | 2-4 |
| Micronized Montanic Acid | — | — | — | 0-3 | 0-3 | — |
| Polytetrafluoroethylene | — | — | 0-1.5 | 0-1.5 | 0-1.5 | 2-3 |
| Powder Abrasives | 3-5 | 3-5 | 1-2 | 1-2 | — | — |
| Calcium Carbonate | 1-2 | 1-2 | 1-2 | 1-2 | 1-2 | 1-2 |
| Fragrance | q.s | q.s | q.s | q.s | q.s | q.s |
| Color | q.s | q.s | q.s | q.s. | q.s | q.s |
| Water | 60-70 | 60-70 | 60-70 | 60-75 | 60-70 | 60-70 |

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

REFERENCES

Kasprzak, K., "A guide to formulating Water-in-Silicone emulsions with Dow Corning® 3225C formulation aid," Dow Corning Internal Document, Form no. 25-713-01 (1995).

Dahms, G., and Zombeck, A., "New formulation possibilities offered by silicone copolyols," Cosmetics & Toiletries, Vol 110 number 3, p 91+ (1995). Also available as Dow Corning Internal Document, Form no. 25-710-01 (1995).

Hickerson, R. and Van Reeth, I., "Silicone Emulsifiers Guide," Dow Corning Internal Document, Form no. 27-1063-01 (2002).

What is claimed is:

1. An automotive wax liquid composition comprising a water-in-oil emulsion comprising:
   a. an oil phase carrier at about 12-20 wt %;
   b. one or more emulsifiers at about 2-7 wt %;
   c. a shine enhancing agent at about 0.1-3 wt %;
   d. a waxing agent at about 0.1-4 wt %;
   e. a lubricating agent at about 0.1-2 wt %;
   f. a polishing agent at about 0.1-8 wt %; and
   g. water at about 55-80 wt %;
      wherein the water-in-oil emulsion is free of volatile organic compounds and preservatives,
      wherein the water-in-oil emulsion is a stable emulsion and does not require addition of viscosifying agents or emulsion stabilizers.

2. The composition of claim 1, wherein the oil phase carrier comprises a siloxane, a cyclomethicone or cyclopentasiloxane.

3. The composition of claim 1, wherein the emulsifiers comprise one or more dimethicone copolyols.

4. The composition of claim 1, wherein the shine enhancing agent comprises dimethyl siloxane, an alkyl siloxane, a cationic amino-functional quaternized silicone, an aliphatic substituted silane, an alkoxy substituted aliphatic siloxane, or another siloxane that may form reactive silanol groups.

5. The composition of claim 1, wherein the emulsion additionally comprises a tracing agent at about 0.1-4 wt %.

6. The composition of claim 1, wherein the composition is configured for an application by hand or a hand-held buffer, and wherein the emulsion is configured to break upon friction with a contact surface and release one or more oil-soluble components.

7. An automotive body treatment liquid composition comprising a water-in-oil emulsion comprising:
   a. an oil phase carrier at about 10-25 wt %;
   b. one or more emulsifiers at about 1-10 wt %;
   c. a lubricating agent at about 0.1-2 wt %;
   d. a shine enhancing agent at about 0.1-3 wt %;
   e. one or more surface enhancing agents selected from a group comprising: a polishing agent, a waxing agent, or a combination thereof at about 0.1-20 wt %; and
   f. water at about 55-80 wt %;
      wherein the water-in-oil emulsion is free of volatile organic compounds and preservatives,
      wherein the water-in-oil emulsion is a stable emulsion and does not require addition of viscosifying agents or emulsion stabilizers.

8. The composition of claim 7, wherein the oil phase carrier comprises a siloxane, a cyclomethicone or cyclopentasiloxane.

9. The composition of claim 7, wherein the emulsifiers comprise one or more dimethicone copolyols.

10. The composition of claim 7, wherein the shine enhancing agent comprises dimethyl siloxane, an alkyl siloxane, a cationic amino-functional quaternized silicone, an aliphatic substituted silane, an alkoxy substituted aliphatic siloxane, or another siloxane that may form reactive silanol groups.

11. A method of forming an automotive wax product, water-in-oil emulsion, the method comprising:
   a. charging a mixing vessel under vortex agitation with a plurality of components, the components comprising:
      i. an oil phase carrier at about 12-20 wt %;
      ii. one or more emulsifiers at about 2-7 wt %;
      iii. a shine enhancing agent at about 0.1-3 wt %;
      iv. a waxing agent at about 0.1-4 wt %; and
      v. a lubricating agent at about 0.1-2 wt %;
      wherein the temperature is about 20-25° C., and wherein the vortex agitation is caused by a mixer running at a first mixing speed;
   b. adding a polishing agent at about 0.1-8 wt % and running the mixer at a second mixing speed;
   c. adding a tracing agent at about 0.1-8 wt % and running the mixer at a third mixing speed;
   d. adding a first volume of water; and
   e. optionally increasing the speed of the mixer to a fourth mixing speed and adding a second volume of water, thereby producing a water-in-oil liquid emulsion;
   wherein the combined volumes of water comprise about 55-80 wt % of the emulsion,
   wherein the water-in-oil liquid emulsion is a stable emulsion and does not require addition of viscosifying agents or emulsion stabilizers, and wherein the water-in-oil liquid emulsion is free of volatile organic compounds and preservatives.

12. The method of claim 11, wherein the first mixing speed is about 250-300 rpm, the second mixing speed is about 250-450 rpm, the third mixing speed is about 400-750 rpm, and the fourth mixing speed is about 500-750 rpm.

13. The method of claim 11, wherein a total processing time is less than 45 min.

14. The method of claim 11, wherein no heating is required.

15. The method of claim 11, wherein the oil phase carrier comprises a siloxane, a cyclomethicone or cyclopentasiloxane.

16. The method of claim 11, wherein the emulsifiers comprise one or more dimethicone copolyols.

17. The method of claim 11, wherein the shine enhancing agent comprises dimethyl siloxane, an alkyl siloxane, a cationic amino-functional quaternized silicone, an aliphatic substituted silane, an alkoxy substituted aliphatic siloxane, or another siloxane that may form reactive silanol groups.

18. The method of claim 11, wherein the composition is configured for an application by hand or a hand-held buffer, and wherein the emulsion is configured to break upon friction with a contact surface and release one or more oil-soluble components.

19. The composition of claim 7, wherein the emulsion further comprises a tracing agent at about 0.1-4 wt %.

20. The composition of claim 7, wherein the emulsion is configured to break upon friction with a contact surface and release one or more oil-soluble components.

* * * * *